United States Patent
Redinger

[19]

[11] Patent Number: 6,032,936
[45] Date of Patent: Mar. 7, 2000

[54] FLUID MOUNT INCLUDING A PARTITIONLESS COMPENSATOR

[75] Inventor: W. Scott Redinger, Erie, Pa.

[73] Assignee: Lord Corporation, Cary, N.C.

[21] Appl. No.: 08/905,368

[22] Filed: Aug. 4, 1997

[51] Int. Cl.[7] ....................................................... F16F 9/10
[52] U.S. Cl. .................... 267/140.11; 188/378; 188/352; 92/79; 267/136
[58] Field of Search .......................... 267/140.11, 140.12, 267/140.13, 140.14, 140.15, 141.1, 35, 219, 220, 136; 188/378–380, 352, 314, 298; 416/140, 106, 134 A; 248/562, 636, 638; 60/588; 92/79; 138/42; 137/171, 206, 197, 198

[56] References Cited

U.S. PATENT DOCUMENTS

| | | | |
|---|---|---|---|
| 3,651,902 | 3/1972 | Peddinghaus | 188/269 |
| 4,103,492 | 8/1978 | Sakazume | 188/352 |
| 4,236,607 | 12/1980 | Halwes et al. | 188/378 |
| 4,349,184 | 9/1982 | Peterson et al. | 267/153 |
| 4,817,925 | 4/1989 | Sprang et al. | 267/140.13 |
| 5,501,434 | 3/1996 | McGuire | 267/140.11 |
| 5,540,549 | 7/1996 | McGuire | 416/140 |
| 5,735,510 | 4/1998 | Takehara et al. | 267/140.13 |
| 5,788,372 | 8/1998 | Jones et al. | 267/136 |

FOREIGN PATENT DOCUMENTS

| | | |
|---|---|---|
| 1.549.300 | 12/1968 | France . |
| 2.060.392 | 6/1971 | France . |

*Primary Examiner*—Douglas C. Butler
*Attorney, Agent, or Firm*—Randall S. Wayland; Wayne W. Rupert; James W. Wright

[57] ABSTRACT

A fluid mounting (20) for isolating or damping vibration between a vibrating member (21) and a structure (23). In one aspect, the fluid mounting (20) includes inner (22) and outer (24) members, a flexible element (26), first (28) and second (30) operating chambers, a fluid passageway (32) interconnecting operating chambers (28, 30), and a partitionless volume compensator (36) including a compensator chamber (38) separated into a gas-filled portion (40) and a fluid-filled portion (42). Notably, the chamber (38) is devoid of any separating barrier. At least one lock passage (44) interconnects the fluid-filled portion (42) with one of the first and second operating chambers (28, 30), and a working fluid (34). Preferably a bubble trap depression (46) focuses any gas bubbles into the lock passage (44). In another aspect, mounting (20) may include laminated shim construction with sloping profiles thereon to prevent bubble trapping.

9 Claims, 3 Drawing Sheets

FLUID MOUNT INCLUDING A PARTITIONLESS COMPENSATOR

FIELD OF THE INVENTION

This invention relates to devices for controlling dynamic vibration. Specifically, it relates to fluid mountings for control of vibration between a vibrating member and structure.

BACKGROUND OF THE INVENTION

Fluid or hydraulic mountings include a fluid which augments isolation and/or damping characteristics that may be achieved in elastomer mountings alone. This augmentation may take the form of adding additional damping or added inertial forces. Fluid mountings are generally described in LORD® Technical Article LL-2166 entitled "Understanding Hydraulic Mounts for Improved Vehicle Noise, Vibration and Ride Qualities" by W. C. Flower. Commonly assigned U.S. Pat. No. 4,811,919 to Jones describes a fluid mounting which incorporates a volume compensator. Other examples of fluid mountings and dampers may be found in commonly assigned U.S. Pat. No. 5,413,320 to Herbst, U.S. Pat. No. 5,374,039 to Schmidt et al., U.S. Pat. No. 5,127,607 to McGuire, and U.S. Pat. No. 5,197,692 to Jones et al., U.S. Pat. No. 5,540,549, to McGuire and U.S. Pat. No. 5,501,434 to McGuire. Fluid mountings are, in essence, tunable passive devices which use a fluid to add additional damping or tuned-fluid "inertia" effects. In all these devices, compensation of fluid expansion, pressurization, and fill to remove gas bubbles is a problem. However, prior art methods of accomplishing these feats have involved utilization of multi-component systems which tend to add unwanted cost and complexity. In particular, it is very important in aggressive fluid mounting applications, such as in fluid pylon isolators, that no gas bubbles are present in the operating chambers. In essence, relative movement between the inner and outer member will cause any bubble present to expand and contract instead of moving the fluid between the chambers. This degrades performance. Further, reliable methods of providing pressurization to minimize cavitation of the fluid at high relative motions is required.

Therefore, there is a recognized need for more effective and cost efficient methods of compensation, pressurization, and fill in fluid mounts.

SUMMARY OF THE INVENTION

Therefore, in light of the advantages and drawbacks of the prior art, the present invention is a fluid mounting adapted for attachment between a vibrating member and a structure for isolating or damping vibration therebetween. Accordingly, the present invention fluid mounting comprises a first and second operating chambers, a fluid passageway interconnecting the first and second operating chambers, a partitionless volume compensator including a compensator chamber separated into a gas-filled portion and a fluid-filled portion. The gas-filled portion overlies the fluid-filled portion and the chamber is devoid of any barrier separating the portions. At least one lock passage interconnects the fluid-filled portion with one of said first and second operating chambers. When operated in its upright orientation, any gas bubbles migrate upward through the lock passageway and into the gas-filled portion of the compensator, yet the fluid-filled portion is dynamically locked at the operating frequency of the mounting.

In another aspect, a bubble trap formed in a wall portion of one of said chambers focuses any bubbles present into said at least one lock passage. Preferably, the bubble trap is an annular groove formed by cooperation between a chamfer formed on a plug hole chamber and a chamfer formed on a plug received within said plug hole. In another aspect, a plurality of lock passages increase the speed at which bubbles enter the compensator chamber. In another aspect, an extension within the volume compensator extends part way into the compensator chamber and includes an opening cooperating with the lock passageway(s). The opening is always covered by the fluid regardless of an orientation of said mounting. This prevents air, once it leaves the operating chambers, from getting back in. In another aspect, the flexible element includes laminated construction which includes at least one rigid shim and at least two elastomer layers. Each of the at least two elastomer layers including a sloping end portion, one of which intersects with an end of said at least one rigid shim and another which intersects with an end of said inner member, thereby preventing gas bubbles from becoming trapped. This aids in fill of the mounting.

It is an advantage of the present invention that the partitionless compensator eliminates one or more components from the fluid mounting.

It is advantage of another aspect of the present invention that gas bubbles can be easily and quickly removed from the operating chambers during fill and during operation.

It is advantage of another aspect of the present invention that once the gas bubbles are removed, it is difficult for them to reenter the operating chambers.

The above-mentioned and further features, advantages and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE INVENTION

Figure 1A:
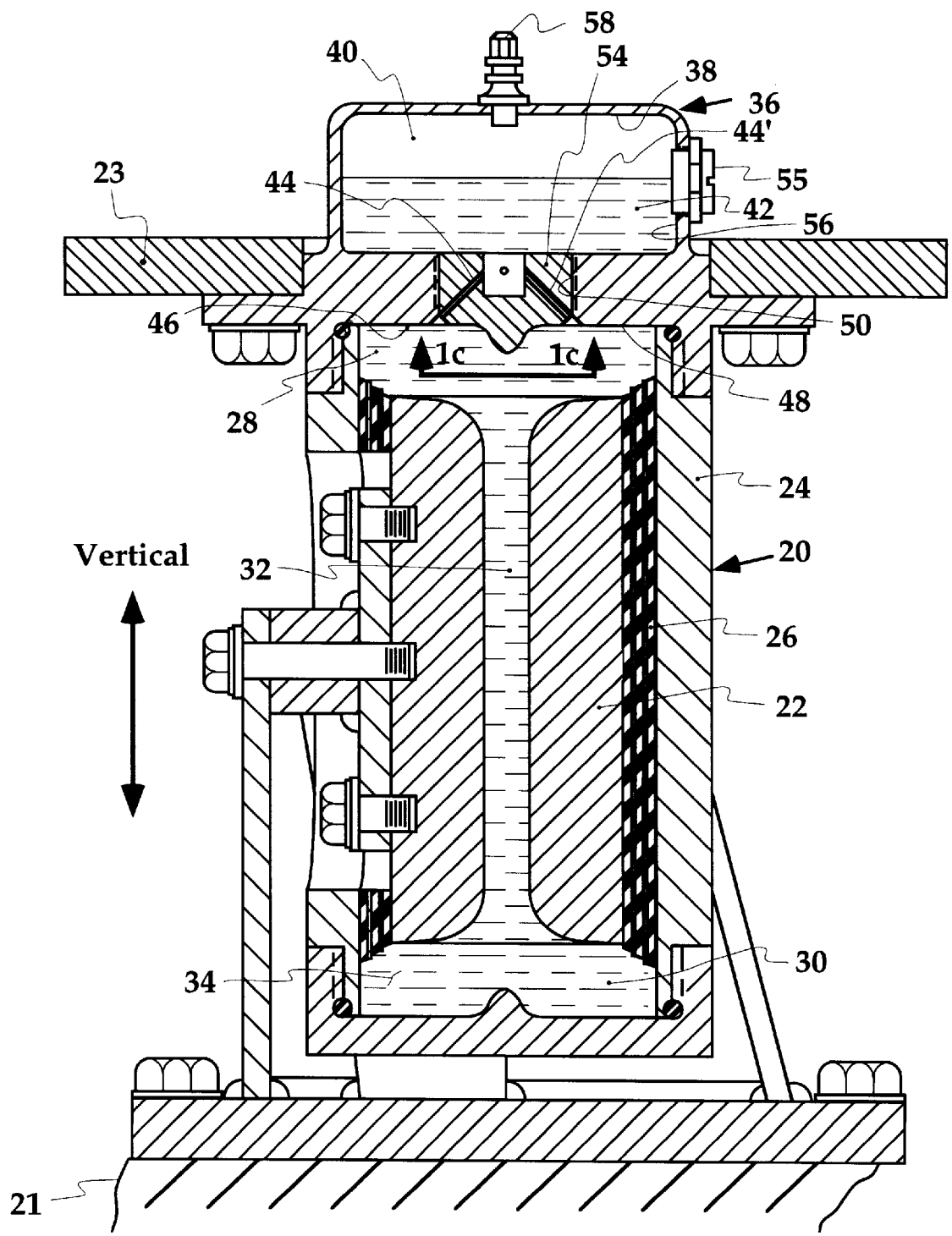
FIG. 1a is a partial cross-sectioned side view of the present invention fluid mounting including partitionless compensator and bubble shedding features.

Referring now to the Drawings where like numerals denote like elements, in FIG. 1a, shown generally at 20, is a first embodiment of the fluid mounting including a partitionless compensator 36. The fluid mounting 20 is useful for controlling, and preferably minimizing, dynamic vibration (motion and/or force) transmitted between a vibrating member 21, such as an helicopter transmission or the like, and a structure 23, such as an aircraft fuselage, or the like. A detailed description of this type of mounting is found in U.S. Pat. No. 4,236,607.

The fluid mounting 20 comprises an elongated rigid inner member 22 adapted for interconnection to a first member 21, such as a rigid structure, for example, a helicopter fuselage, and an outer member 24 adapted to be attached to a second member 23, such as a vibrating element, for example, a helicopter transmission or pylon. A flexible elastomer element 26 flexibly supports the inner member 22 relative to the outer member 24. Preferable materials include natural rubber, natural rubber and synthetic blends. Although, other suitable elastomers or flexible materials could also be used. As will be described later, the elastomer section may include laminated construction.

First 28 and second 30 operating chambers are formed within the mounting 20, each of which preferably interacts with end portions of the flexible elastomer section 26. A fluid passageway 32 which may include a tuned fluid inertia (resonant mass effect) interconnects the first and second operating chambers 28, 30. This achieved by appropriate selection of the length and diameter of the passageway 32. A fluid 34 is oscillated back and forth through passageway 32 as a result of dynamic vibrations between the inner member 22 and outer member 24.

In a particularly novel feature, a partitionless volume compensator 36 attaches to a portion of the outer member 24. The partitionless compensator 36 includes a compensator chamber 38 including a gas-filled portion 40 and a fluid-filled portion 42. The gas-filled portion 40 overlies the fluid-filled portion 42 and the chamber 38 is devoid of any barrier separating the portions 40, 42. Prior art compensators for fluid mounts include a flexible partition separating the various portions, for example, as is shown in U.S. Pat. No. 4,811,919 to Jones. An additional example may be found in copending application Ser. No. 08/533,227 entitled "High Temperature Fluid Mount". Removal of this diaphragm separation is key to the operation of one aspect of the present invention.

At least one lock passage 44 interconnects between the fluid-filled portion 42 of chamber 38 and one of the first and second operating chambers 28, 30. The lock passage 44 is of the appropriate length and diameter such that flow is minimized at the predominant operating frequency of the mounting, i.e., the passage is locked. A fluid 34 such as silicone or perfluorinated polyether is contained within the first and second operating chambers 28, 30, the fluid passageway 32, the fluid-filled portion 42, and the at least one lock passage 44.

The viscosity of the fluid 34 is relevant to the operation of the invention. Notably, if the apparatus is an isolator a low viscosity (about 1–100 centistoke) fluid is needed, whereas if the device is a damper, a higher viscosity is desired (ex. 100–10000 centistoke). Preferably, the mounting also includes a bubble trap depression 46 formed in a wall portion 48 of one of said chambers 28, 30. The bubble trap 46 is an irregularity formed in the surface which focuses any bubbles present into the at least one lock passage 44. The surface leading to the bubble trap preferably includes a taper or incline. Notably, the bubble trap 46 is a depression at an even greater slope than the incline. This preferably dramatic change in slope catches any gas bubble and quickly diverts it through the lock passageway 44.

Figure 1B:
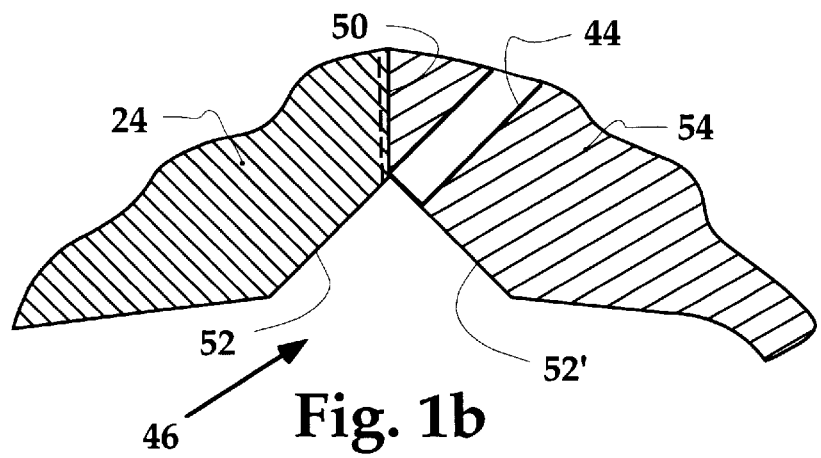
FIG. 1b is an enlarged partial cross-sectioned side view of one embodiment of a bubble trap.

In one embodiment, as best illustrated in FIG. 1b, the bubble trap 46 is an annular groove formed into a wall portion of the first operating chamber 28. The bubble trap 46 is preferably formed by cooperation between a chamfer 52 formed on a plug hole 50 interconnecting between the compensator chamber 38 and one of the operating chambers 28, 30 and a chamfer 52' formed on a plug 54 received within said plug hole 50. Together, the chamfers 52, 52' form an annular groove. Notably, the shape of the groove could be varried.

Figure 1C:
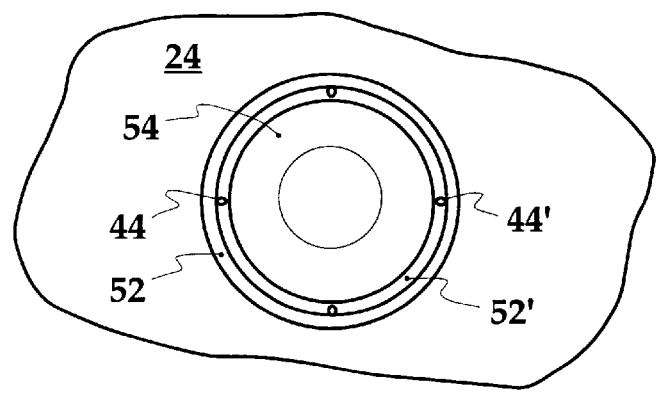
FIG. 1c is an bottom view of the bubble trap along line c—c of FIG. 1a, FIG. 1d is an bottom view of a bubble shedding laminated elastomer section.

In another aspect, it is preferable that the at least one lock passage 44 comprise a plurality of lock passages 44, 44' to increase the speed at which bubbles may enter into the chamber 38. For example, a bubble may enter through one lock passage 44 and the displaced fluid may exit through the other lock passage 44'. Even more lock passageways may be included if desired (See FIG. 1c). Preferably, the at least one lock passage 44 should exhibit a diameter greater than about 0.03 inch. More preferably, the at least one lock passage 44 exhibits a diameter between about 0.03 inch and 0.09 inch, and most preferably, a diameter of about 0.06 inch. Notably, it was discovered by the inventor that for sizes less than about 0.03 inches, bubbles do not pass easily into the chamber 38 and tend to get caught in the operating chamber 28. Bubbles in the chambers 28, 30 may significantly degrade performance. Likewise, diameters above 0.09 inch tend to allow fluid 34 to oscillate through the lock passageway 44. Preferably, a plurality of lock passages 44, 44' interconnect between the compensator chamber 38 and an annular bubble trap 46 formed in a wall portion 48 of a highest one of said operating chambers 28, 30.

The compensator chamber 38 should preferably be about half full of fluid 34. A sight glass 55 is preferably mounted to a vertical wall portion 56 of said compensator chamber 38 enables viewing of the level of fluid 34 within the chamber 38. A fill valve 58 provides means for pressurizing said gas-filled portion 40 thereby pressurizing the operating chambers 28, 30.

Figure 2A:
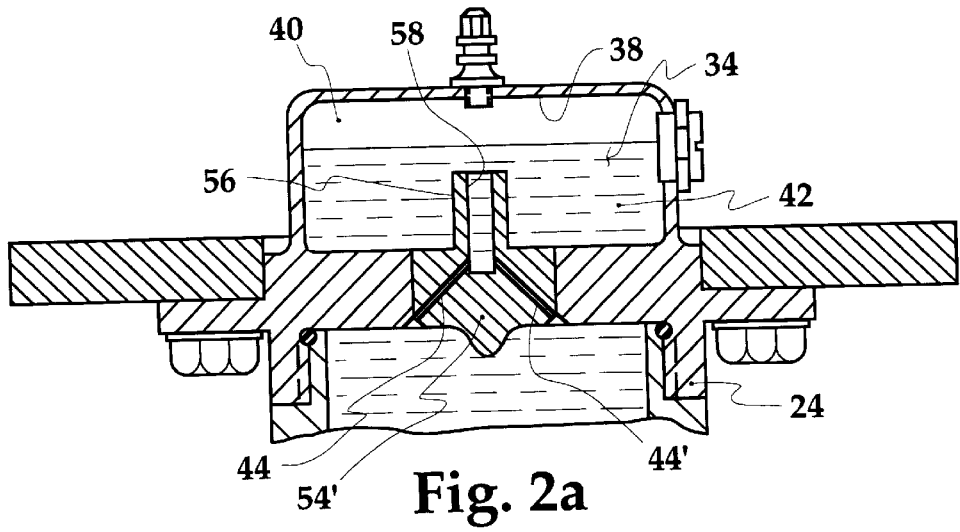
FIGS. 2a, 2b, 2c are cross-sectioned partial side views of another embodiment of the partitionless compensator shown in different orientations.
Figure 2B:
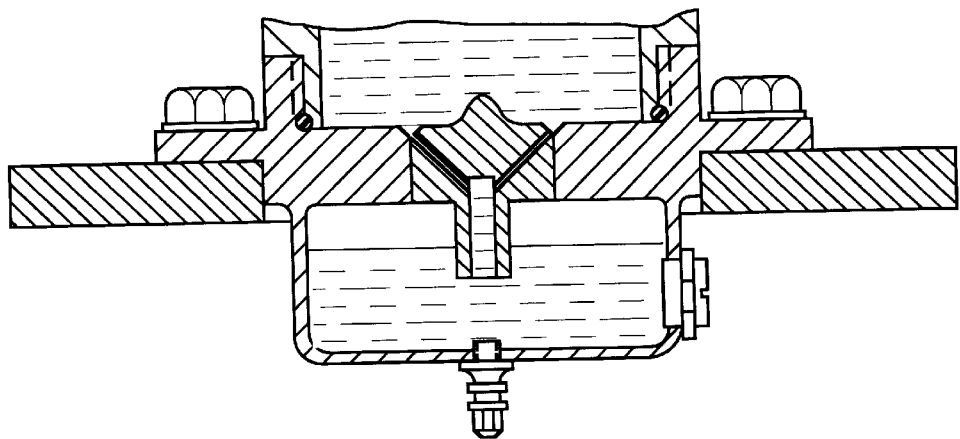
Figure 2C:
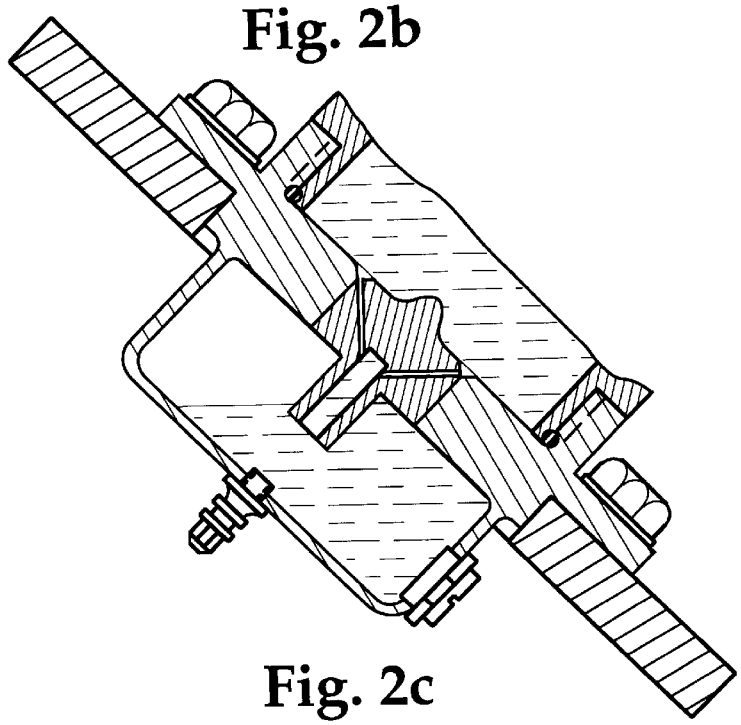

Referring to FIG. 2a–2c, in another aspect which prevents gas bubbles from getting into the chambers 28, 30, an extension 56 projecting from a wall of the chamber 38 within the volume compensator 36 extends part way into the compensator chamber 38. The extension 56 includes an opening 58 which is always covered by the fluid 34 regardless of the orientation of the mounting 20. As shown in FIG. 2a–2c, various orientations of the mount are illustrated, yet in each case, the fluid 34 within the fluid portion 42 covers the opening 58. Since the opening is covered, no air can be reintroduced back into the operating chambers 28, 30. In this embodiment, the fluid 34 level in the chamber 38 must be greater than one-half full, and preferably about two-thirds full. In a best mode, a plurality of lock passages 44, 44' intersect with the opening 58. Preferably, the extension 56 is formed on a plug 54' which threads into said outer member 24.

From the foregoing it should be understood that in an upright orientation, any bubbles formed or within the operating chambers 28, 30 will migrate upward into the bubble trap 46, then into the at least one lock passage 44, through said fluid portion 42, and into said gas-filled portion 40. The gas over fluid design improves on prior art designs in that any gas bubbles that are in the chambers 28, 30 can escape.

Figure 1D:
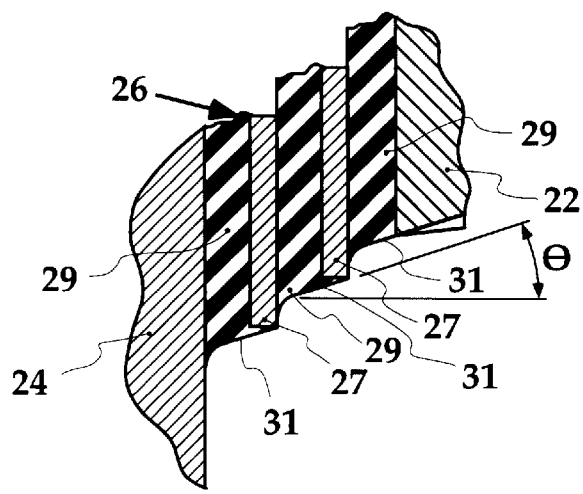

In another aspect illustrated in FIG. 1d, means are incorporated to prevent air trapping within the chambers 28, 30 if the fluid mounting 20 includes a flexible element 26 having laminated construction. By the term laminated construction, what is meant is any flexible element 26 which includes a least one rigid shim 27 and at least two elastomer layers 29. Each of the at least two elastomer layers 29 include a sloping conical end portion 31, one of which preferably intersects with an end of the at least one rigid shim 27 and another which intersects with an end of said inner member 22, thereby preventing gas bubbles from becoming trapped. Preferably, the sloping end portions 31 are angled at an angle theta $\Theta$ of at least 3 degrees from a horizontal plane. Preferably, the at least one rigid shim 27 is tubular-shaped and includes an inner and outer diameter.

The sloping end portion 31 preferably intersects the end of the at least one rigid shim 27 at its inner diameter. Notably, the mold would only locate the shim on this inner diameter. This provides support during bonding and allows the appropriate sloped contour.

While various embodiments, including the preferred embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A fluid mounting, comprising:
   (a) an inner member,
   (b) an outer member,
   (c) a flexible element flexibly supporting said inner member relative to said outer member,
   (d) first and second operating chambers,
   (e) a fluid passageway interconnecting said first and second operating chambers,
   (f) a partitionless volume compensator including a compensator chamber separated into a gas-filled portion and a fluid-filled portion, said gas-filled portion overlying said fluid-filled portion, said compensator chamber being devoid of any barrier separating said portions,
   (g) at least one lock passage interconnecting said fluid-filled portion with one of said first and second operating chambers,
   (h) a fluid within said first and second operating chambers, said fluid passageway, said fluid-filled portion, and said at least one lock passage; and
   (i) an extension within said volume compensator which extends part way into said compensator chamber, said extension including an opening interconnecting said at least one lock passage which is always covered by said fluid regardless of an orientation of said mounting.

2. A fluid mounting of claim 1 wherein said fluid fills about two-thirds of said compensator chamber.

3. A fluid mounting of claim 1 wherein a plurality of lock passages intersect said opening.

4. A fluid mounting of claim 1 wherein said extension is formed on a plug which threads into said outer member.

5. A fluid mounting, comprising:
   (a) an inner member,
   (b) an outer member,
   (c) a flexible element flexibly supporting said inner member relative to said outer member,
   (d) first and second operating chambers,
   (e) a fluid passageway interconnecting said first and second operating chambers,
   (f) a partitionless volume compensator including a compensator chamber separated into a gas-filled portion and a fluid-filled portion, said gas-filled portion overlying said fluid-filled portion, said compensator chamber being devoid of any barrier separating said portions,
   (g) at least one lock passage interconnecting said fluid-filled portion with one of said first and second operating chambers,
   (h) a fluid within said first and second operating chambers, said fluid passageway, said fluid-filled portion, and said at least one lock passage; and wherein said flexible element exhibits laminated construction further including at least one rigid shim and at least two elastomer layers, each of said at least two elastomer layers including a sloping end portion, one of said end portions intersects with an end of said at least one rigid shim and another of said end portions intersects with an end of said inner member thereby preventing gas bubbles from becoming trapped within a lower one of said operating chambers.

6. A fluid mounting of claim 5 wherein said sloping end portions are angled at an angle greater than 3 degrees from a horizontal plane.

7. A fluid mounting of claim 5 wherein said at least one rigid shim is tubular-shaped and includes an inner and outer diameter, and said sloping end portion intersects said end of said at least one rigid shim at said inner diameter.

8. A fluid mounting, comprising:
   (a) an inner member,
   (b) an outer member,
   (c) a flexible element flexibly supporting said inner member relative to said outer member,
   (d) first and second operating chambers,
   (e) a fluid passageway interconnecting said first and second operating chambers,
   (f) a partitionless volume compensator including a compensator chamber separated into a gas-filled portion and a fluid-filled portion, said gas-filled portion overlying said fluid-filled portion, said chamber being devoid of any barrier separating said portions,
   (g) at least one lock passage interconnecting said fluid-filled portion with one of said first and second operating chambers,
   (h) a fluid within said first and second operating chambers, said fluid passageway, said fluid-filled portion, and said at least one lock passage, and
   (i) an extension having an end portion within said compensator chamber, said end portion being covered with fluid regardless of an orientation of said mounting thereby preventing gas bubbles from reentering said operating chambers.

9. A fluid mounting, comprising:
   (a) an inner member,
   (b) an outer member,
   (c) a flexible element flexibly supporting said inner member relative to said outer member, said flexible element including a laminated construction further including at least one rigid shim and at least two elastomer layers, each of said at least two elastomer layers including a sloping end portion, one of which intersects with an end of said at least one rigid shim and another which intersects with an end of said inner member thereby preventing gas bubbles from becoming trapped,
   (d) first and second operating chambers,
   (e) a fluid passageway interconnecting said first and second operating chambers,
   (f) a volume compensator including a compensator chamber,
   (g) at least one lock passage interconnecting said compensator chamber with one of said first and second operating chambers, and
   (h) a fluid within said first and second operating chambers, said fluid passageway, said compensator chamber, and said at least one lock passage.

* * * * *